United States Patent [19]

Guerra et al.

[11] Patent Number: 4,992,335
[45] Date of Patent: Feb. 12, 1991

[54] COMPOSITE MATERIAL AND METHOD OF MAKING SAME

[75] Inventors: Richard J. Guerra, Hudson; David C. Marshall, Nashua, both of N.H.

[73] Assignee: Sanders Associates, Inc., Nashua, N.H.

[21] Appl. No.: 875,838

[22] Filed: Jun. 18, 1986

Related U.S. Application Data

[63] Continuation-in-part of Ser. No. 775,207, Sep. 12, 1985.

[51] Int. Cl.⁵ ............................................. B32B 27/08
[52] U.S. Cl. ...................................... 428/518; 428/520; 428/522; 2/159
[58] Field of Search ................. 428/518, 520, 522; 156/281; 2/159

[56] References Cited

U.S. PATENT DOCUMENTS

| | | |
|---|---|---|
| 2,153,553 | 4/1939 | Fawcett et al. |
| 2,502,841 | 4/1950 | Henderson |
| 2,668,134 | 2/1954 | Horton |
| 2,715,075 | 8/1955 | Wolinski |
| 2,715,076 | 8/1955 | Wolinski |
| 2,801,447 | 8/1957 | Wolinski |
| 2,864,755 | 12/1958 | Rothacker |
| 2,893,908 | 7/1959 | Antlfinger |
| 2,897,092 | 7/1959 | Miller ................................. 428/516 |
| 2,910,723 | 11/1959 | Traver |
| 2,919,059 | 12/1959 | Sporka ................................. 229/3.5 |
| 2,930,106 | 3/1960 | Wrotnowski et al. |
| 3,031,332 | 4/1962 | Rothacker |
| 3,033,707 | 5/1962 | Lacy et al. |
| 3,037,868 | 6/1962 | Rosser |
| 3,274,004 | 9/1966 | Curler et al. |
| 3,343,663 | 9/1967 | Seidler |
| 3,370,972 | 2/1968 | Nagel et al. |
| 3,409,198 | 11/1968 | Peterman, Sr. ................. 156/281 |
| 3,575,793 | 4/1971 | Paisley |
| 3,660,138 | 5/1972 | Gorrell |
| 3,739,052 | 6/1963 | Ayres et al. |
| 3,741,253 | 6/1973 | Brax et al. ........................ 138/137 |
| 3,901,755 | 8/1975 | Martin et al. ................... 428/474.9 |
| 4,008,352 | 2/1977 | Dawes et al. .................... 428/518 |
| 4,112,181 | 9/1978 | Baird, Jr. et al. ............... 428/336 |

(List continued on next page.)

FOREIGN PATENT DOCUMENTS 6559980 8/1980 Australia
5837986 6/1986 Australia (List continued on next page.)

OTHER PUBLICATIONS

Lapedes, D. N., ed. *McGraw-Hill Dictionary of Scientific and Technical Terms,* 2nd ed. (McGraw-Hill, New York, 1978) p. 362.

Gammage, R. B.; Dreibelbis, W. G.; White, D. A.; Vo-Dinh, T. and Huguenard, J. D. Evaluation of Protective Garment Fabrics Challenged by Petroleum and Synfuel Fluids (U.S. Department of Energy, Oak Ridge, Tennessee, 1987), Report No. CONF-870135-2, NTIS Accession No. DE87005687.

(List continued on next page.)

*Primary Examiner*—Edith Buffalow
*Attorney, Agent, or Firm*—Nutter, McClennen & Fish

[57] ABSTRACT

A protective material comprising a layer of vinylidene chloride or saran or polymer or copolymer of vinylidene chloride between two layers of polyethylene or other polyolefin to provide protection against both permeation and breakthrough. A cloth backing or inner layer can be added to this material for comfort. The material can be modified with a reinforcing material such as fiberglass or scrim cloth. Inclusion of an indicator substance between layers, or impregnated in a layer, provided further protection by warning the user of permeation and breakthrough. This material can be utilized in protection clothing such as gloves, as enclosures for instruments and equipment, as a container, and in other applications. The material is preferably formed by first surface oxidizing one or more layers of polyethylene and/or vinylidene chloride or saran or polymer or copolymer of vinylidene chloride, or removing halogen sites from a layer of vinylidene chloride or saran or polymer or copolymer of vinylidene chloride, and then pressing the layers of vinylidene chloride and polyethylene together under heat and pressure such as 330 degrees Fahrenheit at 400 PSI. The protective material can include one or more layers of polyolefin including an electrically conductive material, for electrostatic discharge protection.

41 Claims, 6 Drawing Sheets

U.S. PATENT DOCUMENTS

| | | | |
|---|---|---|---|
| 4,115,334 | 9/1978 | Gerow | 260/28.5 D |
| 4,145,183 | 3/1979 | Bostwick | 427/301 |
| 4,274,999 | 6/1981 | Burley et al. | 260/45.755 |
| 4,405,557 | 9/1983 | Lehnard | |
| 4,407,443 | 10/1983 | McCorkle et al. | 428/916 |
| 4,421,780 | 12/1983 | Buzio et al. | 427/301 |
| 4,424,911 | 1/1984 | Resnick | 428/916 |
| 4,526,828 | 7/1985 | Fogt et al. | |
| 4,601,783 | 7/1986 | Kruilik | 427/307 |
| 4,629,636 | 12/1986 | Courduvelis et al. | 427/307 |
| 4,699,804 | 10/1987 | Miyata et al. | 427/322 |
| 4,749,084 | 6/1988 | Pereyra | 428/916 |
| 4,755,405 | 7/1988 | Massucco et al. | 428/916 |

FOREIGN PATENT DOCUMENTS

| | | |
|---|---|---|
| 968689 | 6/1975 | Canada . |
| 982923 | 2/1976 | Canada . |
| 0069495 | 1/1983 | European Pat. Off. . |
| 0076366 | 4/1983 | European Pat. Off. . |
| 0123966 | 7/1984 | European Pat. Off. . |
| 0140711 | 5/1985 | European Pat. Off. . |
| 0149321 | 7/1985 | European Pat. Off. . |
| 1145088 | 10/1957 | France . |
| 1177867 | 4/1959 | France . |
| 2219002 | 9/1974 | France . |
| 714843 | 9/1954 | United Kingdom . |
| 732047 | 6/1955 | United Kingdom . |
| 1011608 | 12/1965 | United Kingdom . |
| 1171123 | 5/1967 | United Kingdom . |
| 1522397 | 8/1978 | United Kingdom . |
| 1591423 | 6/1981 | United Kingdom . |
| 2113532 | 8/1983 | United Kingdom . |
| 1041893 | 9/1984 | United Kingdom . |
| 2124551 | 11/1985 | United Kingdom . |
| 2129737 | 7/1986 | United Kingdom . |
| WO83/03205 | 9/1983 | World Int. Prop. O. . |

OTHER PUBLICATIONS

Agranoff, J., ed., *Modern Plastics Encyclopedia*, 1984–1985, pp. 476–477, McGraw-Hill, New York.

*Films, Sheets, and Laminates*, The International Plastics Selector, Inc., San Diego, 1979, pp. 92–94.

Feigl, F., *Chemistry of Specific, Selective and Sensitive Reactions*, Academic Press, Inc., New York, 1949, pp. 338, 339, 343–345.

Feigl, F., Spot Tests, vol. II, "Organic Applications", 4th English Edition Elsevier Publishing Company, New York, 1954, pp. 146–148.

Colletta, G. C., "Chemical Protective Clothing: Determining Good Performance," *Occupational Health & Safety*, (Apr. 1985), pp. 20, 21, 23, 72.

"Saran" (definition) In: *McGraw-Hill Dictionary of Scientific and Technical Terms*, 2nd ed., McGraw-Hill, New York, 1978.

Kirk-Othmer, *Encyclopedia of Chemical technology*, Third Edition, vol. 14, John Wiley & Sons, Inc., 1981, pp. 859–862.

*IH-244 Silver Shield TM Gloves* (brochure), North Hand Protection, A Division of Siebe North, Inc., Charleston, SC.

*Plastistat TM Static Dissipative Work Stations* (brochure), Plastic System, Inc., Marlboro, MA., pp. 1–2.

*Technical Data: Tetra-Etch Teflon Etchant*, W. L. Gore & Associates, Inc., Neward, Delaware, pp. 1–3.

*Material Safety Data Sheet*, U.S. Department of Labor, Occupational Safety and Health Administration, Form OSHA-20, Revised 9/8/83. pp. 1–2.

Petersen, R. J. and Rozelle, L. T. *Ultrathin Membranes for Blood Oxygenators* (National Technical Information Service, Springfield, VA, 1974) NTIS Accession No. PB-231 324.

Petersen, R. J. and Rozelle, L. T. *Provide Ultrathin Membranes for Evaluation in Blood Oxygenators*. (National Technical Information Service, Springfield, VA, 1972) NTIS Accession No. PB-211 408.

Weeks, R. W., Jr. and McLeod, M. J. *Permeation of Protective Garment Material by Liquid Benzene* (National Technical Information Service, Springfield, VA, 1980) NTIS Accession No. LA-8164-MS.

Siegel, Lee, "Hospital gloves found susceptible to leakage" in *The Boston Glove*, Oct. 26, 1988 (Boston, MA) p. 10.

*Hydrofluoric Acid (HF) Permeation Testing Coated and Laminated Fabrics of Tyvek®️ Spunbonded Olefin*, Doc. 2194f, E. I. Du Pont de Nemours & Company, Textile Fibers Department, Wilmington, Delaware, Jan., 1984.

*SARANEX Films: Fresh Ideas for Barrier Packaging*, Form No. 500-1071-85, (brochure), Dow Chemical U.S.A., Midland, Michigan, Oct., 1985.

*Supplier Information for Users of SARANEX Films*, Form No. 500-1072-85, (brochure), Dow Chemical U.S.A., Midland Michigan.

Kirk-Othmer, *Encyclopedia of Chemical Technology* 3rd ed. vol. 16 (John Wiley & Sons, New York, 1981) pp. 76, 77 and 93–95.

Kirk-Othmer, *Encyclopedia of Chemical Technology*, 3rd ed. vol. 23 (John Wiley & Sons, New York, 1983) pp. 787–790, 796.

Brown, W. E., "Vinylidene chloride polymers and copolymers," In: *Modern Plastics Encyclopedia*, 1983–1984, Oct. 1983, vol. 60, No. 10A, pp. 90–92, McGraw-Hill, New York.

Gilbert, P. G. "High and low density polyethylene," In *Modern Plastics Encyclopedia*, 1983–1984 Oct. 1983, vol. 60 No. 10A, pp. 55–60, McGraw-Hill, New York.

Ward, T. K. "Linear low density polyethylene," *In Modern Plastics Encyclopedia* 1983–1984, Oct. 1983, vol. 60, No. 10A, p. 60, McGraw-Hill, New York.

Nurse, R. H. "HMW high density polyethylene," In *Modern Plastics Encyclopedia* 1983–1984, Oct. 1983, vol. 60, No. 10A, pp. 60–62, McGraw-Hill, New York.

COMPOSITE MATERIAL AND METHOD OF MAKING SAME

CROSS-REFERENCE TO RELATED APPLICATION

This is a continuation-in-part of U.S. patent application Ser. No. 775,207, filed Sept. 12, 1985.

BACKGROUND OF THE INVENTION

The present invention relates to composite materials and methods of making same, and more particularly to composite materials including an addition polymer from an unsaturated monomer, and methods of making same.

Chemicals used in the electronics industry, among others, include chlorinated solvents such as 1,1,1-trichloroethane or methylene chloride, and inorganic acids such as hydrofluoric acid and nitric acid. Accordingly, there is a need for protective clothing that will protect humans from contact with hazardous organic solvents, acids, and other chemicals.

Organic solvents of many varieties and characteristics are widely used by many industries. Many of these substances are readily absorbed through the intact skin. Widespread and profound biological dysfunctions can be produced by penetration of these substances into the body's metabolic systems. Such penetration generally occurs in two modes through any given protective material, by permeation and by breakthrough. Permeation occurs when the vapors as gaseous forms of a substance are able to pass through the protective material and become detectable on the opposite side of the membrane or material. Gaseous diffusion, therefore, delivers the substance to the skin interface, which must be protected. Once gaseous diffusion has occurred, the substance is free to penetrate and absorb through the skin barrier. Breakthrough occurs when a liquid or solid form of a substance actually leaks through the protective material. Once through the material, the substance is then freely available for absorption through the intact skin.

Those concerned with the development of protective materials such as gloves have long recognized the need for protection and prevention of skin contact with toxic chemicals, including aqueous solutions, caustics, acids, and organic solvents, such as are used in the electronics industry. One of the most critical problems confronting designers of protective materials such as gloves has been protection and prevention of contact with toxic chemicals, which is overcome by the present invention. Gloves of prior art materials such as latex and buna rubber have been found to quickly dissolve in chlorinated solvents or to otherwise not provide the desired protection in such situations. Much of the materials available are either dissolved or penetrated in minutes. This results in inadequate protection allowing chemicals to be absorbed into the body through the skin or damaging the skin itself. The present invention fulfills the need for improved protection against skin absorption and skin contact with such chemicals.

Polyethylene has long been recognized as a desirable polymer to contain many of these chemicals. Its hydrophobic nature resists wetting, particularly by aqueous solutions. One critical drawback, however, is the ability of solvent vapors to readily penetrate the polymer. Films of vinylidene chloride, polymers or copolymers (such as with vinyl chloride) of vinylidene chloride, or saran such as sold under the trademark "SARAN" have low permeation by gases and liquids, although their chemical resistance is not as good as polyethylene.

Presently available equipment, such as polyvinyl chloride (PVC) gloves or polyethylene gloves, either disintegrate when contacted by solvents (e.g., with PVC) or allow a significant amount of solvent vapor to penetrate (e.g., with polyethylene). Composite materials combining natural or synthetic rubbers with various fabrics are too cumbersome for delicate work and are expensive.

Polyurethane gloves are believed to provide protection against permeation and breakthrough from organic solvents, but not for caustics and acids.

G. C. Paisley U.S. Pat. No. 3,575,793 issued Apr. 20, 1971 appears to teach a laminate of biaxially oriented polypropylene film to a cellophane film having, on at least the surface contacting the polypropylene, a coating of saran applied from a solvent solution. H. Curler, et al. U.S. Pat. No. 3,274,004 issued Sept. 20, 1966 appears to teach a laminate of saran-coated cellophane between layers of polyethylene with an additional outside layer of oriented polypropylene film. Neither of these references appear to show lamination of an unsupported, preformed saran film to a polyolefin layer.

SUMMARY OF THE INVENTION

Accordingly, it is a general purpose of the present invention to provide a protective material, and a method of making a protective material, which provides protection against both permeation and breakthrough.

Other objects of the present invention are to provide a protective material, and a method of making a protective material, which provides protection to a person against both liquids and vapors, which will not readily dissolve in certain acids, which provides a vapor barrier layer, which can be utilized in protective clothing such as gloves, which can be utilized in containers or enclosures such as for instruments or equipment, which is inexpensive, and which is not penetrated by common solvents and chemicals.

Further objects of the present invention are to provide a protective coating and method of making a protective coating which provides protection against skin absorption of and skin contact with chemicals or hazardous substances, which can be reinforced, which can provide an indicator to warn the user of impending problems, and which can be provided with an inner layer for comfort.

Still another object of the present invention is to provide a method of laminating polyolefin to saran or vinylidene chloride polymers or copolymers that results in good adhesion.

Yet another object of the present invention is the provision of protection against static charges.

Briefly, these and other objects of the invention are accomplished by a material comprising a layer of polyolefin (such as polyethylene or polypropylene) and a layer of material selected from the group consisting of saran, vinylidene chloride, vinylidene chloride polymers, copolymers (such as with vinyl chloride) of vinylidene chloride, and any combination thereof. The material of the invention is preferably formed by surface treating polyolefin layer or layers, and/or saran or vinylidene chloride or vinylidene chloride polymer or copolymer or combination thereof layer or layers, by oxidation, and then pressing the layers of polyolefin and saran or vinylidene chloride or vinylidene chloride polymer or copolymer or combination thereof together under heat and pressure to form a laminate. Surface oxidation can be accomplished by surface treatment with a solution comprising a hexavalent chromium compound and hydrogen ion. Surface oxidation can alternatively be accomplished by surface treatment with a solution comprising a permanganate and water. Alternatively, the material of the invention can be formed by removing chlorine atoms from at least one surface of a layer of material selected from the group consisting of saran, vinylidene chloride, vinylidene chloride polymers, copolymers (such as with vinyl chloride) of vinylidene chloride, and any combination thereof, and then pressing at least one such treated surface against a layer of polyolefin under heat and pressure to form a laminate. An article of clothing or apparel, such as a glove, can be formed from this material.

The material can further comprise additional layers of polyolefin and/or saran or vinylidene chloride or vinylidene chloride polymers or copolymers or any combination thereof. The material can further comprise an indicator substance which can be inserted between the above layers such as in a separate layer, or impregnated in a layer. The indicator can be general or type specific. The material can be modified with a reinforcing material such as fiberglass or scrim cloth.

The laminated material can comprise a layer of conductive, resistive or electrostatic discharge-capable polyolefin or other material. An article of clothing or apparel, such as a glove, can be provided with a grounding line or connector adapted to connect such clothing or apparel to an electrical ground.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
FIG. 1 is a sectional view of a laminate according to the present invention.

Referring now to the drawings, wherein like reference characters designate like or corresponding parts throughout the several views, there is shown in FIG. 1 a laminate 11 comprising a layer 13 of polyethylene laminated to an unsupported preformed layer 15 of saran, vinylidene chloride, vinylidene chloride polymer(s), copolymer(s) (such as with vinyl chloride) of vinylidene chloride, or a combination thereof. Layer 13 and layer 15 can, for example, each be a film or sheet. Alternatively, layer 13 can be of a polyolefin such as polyethylene or polypropylene. Examples of saran are given in F. N. Rothacker U.S. Pat. No. 3,031,332 issued Apr. 24, 1962 and in G. C. Paisley U.S. Pat. No. 3,575,793 issued Apr. 20, 1971 which are hereby incorporated by reference. Particular attention is directed to col. 1, lines 25–39 and col. 2, lines 61–64 of Rothacker, and to col. 4, lines 10–27 of Paisley.

At least the adjoining surface of at least one of layers 13 and 15, preferably both, are oxidized before lamination for better adhesion.

Layer 13 or layer 15, or both, can be surface treated in a solution of hexavalent chromium ion (such as from a chromate or chromic oxide), hydrogen ion (such as from acid), and water.

Permanganate, such as potassium permanganate, is a strong oxidizer; see Kirk-Othmer, ed. *Encyclopedia of Chemical Technology*, 3rd ed., Vol. 14, p. 859–862 (John Wiley & Sons, New York, 1981). Layers 13 or 15, or both, can be surface treated in a solution of permanganate and water.

Alternatively, before lamination, chlorine (or other halogen) atoms or ions are removed from the surface of layer 15 that is to adjoin layer 13 during and after lamination.

Layer 15 can alternatively be surface treated before lamination for better adhesion in a solution of alkali metal (such as sodium) or of alkali metal (such as sodium) radical in organic solvent or in liquid anhydrous ammonia.

Following are examples of tests to form such a laminate, particularly showing the importance of surface treatment of at least one layer as disclosed below, with layer 15 utilized in each example being vinylidene chloride copolymer with vinyl chloride in the form of SARAN Wrap plastic film, and temperature and pressure readings being of approximately ±10% to 15% accuracy:

EXAMPLE 1

A 2"×2" sheet of vinylidene chloride copolymer with vinyl chloride and a 2"×2" sheet of polyethylene were cleaned by wiping with methyl ethyl ketone and pressed together, on a WABASH Press Model No. 12-12-2T having a twelve-inch platen, at 350 degrees Fahrenheit and 100 PSIG for five minutes between several sheets of TEFLON glass cloth. The TEFLON glass cloth acts as a release agent and also helps to distribute the pressure. The resulting material initially appeared to have satisfactory adhesion, but repeated folding and stretching caused the two layers to separate. Once such separation started, the two layers came apart easily. Also, the vinylidene chloride copolymer had darkened slightly and became somewhat brittle, indicating too high a process temperature or too long a dwell time at the processing temperature.

EXAMPLE 2

A piece of polyethylene sheet, and a sheet of vinylidene chloride copolymer with vinyl chloride, as in Example 1, were degreased with methyl ethyl ketone and then pressed at 325 degrees Fahrenheit at 200 PSIG for ten minutes. Press pad makeup was as in Example 1. The resulting adhesion was similar to that of Example 1.

EXAMPLE 3

One piece of polyethylene as in Example 1, and a sheet of vinylidene chloride copolymer with vinyl chloride as in Example 1, were cleaned by wiping with methyl ethyl ketone and then pressed together at 330 degrees Fahrenheit and 400 PSIG for ten minutes. Press pad makeup was as in Example 1. Resulting adhesion was similar to that of Example 1. The darkening and brittleness resulting from Example 1 did not recur. The composite tended to curl toward the polyethylene layer.

EXAMPLE 4

A composite of a piece of polyethylene, a piece of vinylidene chloride copolymer with vinyl chloride and a piece of polyethylene was laminated at 330 degrees Fahrenheit at 400 PSIG for ten minutes, using the polyethylene, copolymer of vinylidene chloride, surface preparation and pad makeup of Example 1. The resulting composite remained flat, but had adhesion similar to that of Example 1.

EXAMPLE 5

A layer of vinylidene chloride copolymer and a layer of polyethylene, as in Example 1, were surface cleaned as in Example 1. The layer of polyethylene was then treated for five minutes in a solution of 75 parts by weight of sodium dichromate, 120 parts by weight of distilled water, and 1500 parts by weight of concentrated sulphuric acid. The polyethylene was then rinsed in water and dried. The polyethylene and copolymer of vinylidene chloride were then laminated at 330 degrees Fahrenheit and 400 PSIG for ten minutes. Press pad makeup was as in Example 1. The resulting laminate tended to curl, but could not be separated by cutting or tearing. Adhesion was found to be good. A light brown color developed during lamination, but one could still see through the composite.

EXAMPLE 6

Two layers of polyethylene and one of copolymer of vinylidene chloride, as in Example 4, were cleaned as in Example 1. All three layers were then treated in the sodium dichromate solution of Example 5 and then rinsed in water and dried as in Example 5. The vinylidene chloride copolymer was then placed between the two layers of polyethylene, and the composite laminated at 330 degrees Fahrenheit and 400 PSIG for ten minutes. Press pad makeup was as in Example 1. Resulting adhesion was again found to be good, and was qualitatively judged to be better than that of Example 5. The composite did not curl, but the light brown color was again present.

Alternatively, the solution of Example 5 can include any hexavalent chromium compound such as a chromate (e.g. an alkali metal chromate, dichromate, trichromate, etc.) or chromium trioxide or chromic, dichromic or trichromic acid, and hydrogen ion such as from an inorganic acid such as sulfamic acid, sulfuric acid, or hydrochloric acid. The hexavalent chromium compound can include chromates, dichromates, or trichromates of lithium, sodium, potassium, rubidium, or cesium, or can include any soluble chromate, dichromate or trichromate. The relative proportions of chromium compound and acid should be up to saturation of the compound in the acid. The acid keeps the working solution acidic to control precipitation of hydroxides.

The solution may be oxidizing the treated layer(s). A chromic acid, dichromic acid or trichromic acid may be being formed in the solution. The solution can be used to treat a layer of saran or vinylidene chloride or vinylidene chloride polymer or copolymer alone, a layer of polyolefin alone, or any combination of the above.

Preferably, the chromium compound can be dissolved in water, and the water solution then added to the acid. This procedure improves solubility of the chromium compound, and reduces formation of chromic anhydride, which can precipitate out of the solution. The amount of water so used can be substantially an amount sufficient to dissolve the chromium compound in the water.

Alternatively, the saran or vinylidene chloride or vinylidene chloride polymer or copolymer and polyolefin can be surface cleaned or degreased with any suitable degreasing material, such as a ketone such as methyl ethyl ketone or acetone; a chlorinated organic solvent such as methylene chloride, ethylene dichloride, trichloroethylene, or 1,1,1,-trichloroethane; alcohol; a fluorinated hydrocarbon solvent; an aromatic solvent such as toluene, benzene or xylene; or a soap or detergent type cleaner; or a mixture of any of the above with one or more other substances.

The solution of Example 5 can be applied by any suitable means, such as by dipping, soaking, or spraying. The solution should thereafter be removed, such as by rinsing, removing excess, squeegee, allowing to drip, or wiping.

For Examples 7-25, a fifty-ton WABASH hydraulic press, Model-50-242-TM, with a 18"×24" platen, was used for all laminations.

EXAMPLE 7

A 10"×10" sheet of vinylidene chloride copolymer with vinyl chloride and two 10"×10" sheets of polyethylene were surface cleaned as in Example 1. All three sheets were then treated for five minutes at room temperature in the sodium dichromate solution of Example 5. All three sheets were then rinsed in running tap water and allowed to dry (without wiping). The vinylidene chloride copolymer sheet was then placed between the polyethylene sheets. Press pad makeup was a thin sheet of FEP TEFLON on either side of the three sheets, and four layers of TEFLON glass cloth on the outside of each of the FEP TEFLON sheets. Four layers of TEFLON glass cloth were used on each side of the intended laminate as an aid in distributing pressure and to act as a release layer. A thin layer of fluorinated ethylene propylene (FEP) TEFLON was placed between the TEFLON glass cloth and each polyethylene sheet. Thus, in the stack were, in order, starting from either end, four layers of TEFLON glass cloth, a thin layer of fluorinated ethylene propylene (FEP) TEFLON, a layer of polyethylene, a layer of vinylidene chloride copolymer, a layer of polyethylene, a thin layer of FEP TEFLON, and four layers of TEFLON glass cloth. The FEP TEFLON was incorporated into the pad adjacent to the polyethylene layers in an attempt to impart a smooth surface to the laminate; however, the FEP TEFLON proved to be difficult to work with for such use. Wiping of the vinylidene chloride copolymer sheet also made that sheet harder to handle after the wipe. The composite was then laminated at 350 degrees Fahrenheit and 200 PSIG for ten minutes. The resulting polyethylene/vinylidene chloride copolymer/- polyethylene laminate was slightly wrinkled and appeared to have too much flow.

EXAMPLE 8

A laminate was formed as in Example 7. Press pad makeup was as in Example 7. Results were similar to those of Example 7.

EXAMPLE 9

Two 10"×10" sheets of polyethylene and one 10"×10" sheet of vinylidene chloride copolymer with vinyl chloride, as in Example 7, were surface cleaned as in Example 1. All three layers were then treated in the sodium dichromate solution of Example 5 and then rinsed and dried as in Example 7. Press pad makeup was as in Example 7, except that the FEP TEFLON was not used. The vinylidene chloride copolymer sheet was then placed between the two layers of polyethylene, and the composite laminated at 330 degrees Fahrenheit and 300 PSIG for ten minutes. Resulting adhesion was found to be good.

EXAMPLE 10

Procedure was as in Example 9 except that surface cleaning of the vinylidene chloride copolymer sheet was discontinued because of difficulty in handling the vinylidene chloride copolymer sheet after wiping. This difficulty may have been due to an increase in static charge on the vinylidene chloride copolymer sheet resulting from such wiping. Resulting adhesion was found to be good.

EXAMPLE 11-14

The procedure of Example 10 was repeated four times, each time producing another laminated composite. Resulting adhesion of the laminate was each time found to be good.

EXAMPLE 15

Two laminates, selected from the results of Examples 10-14, were placed on either side of a piece of TEFLON glass cloth, cut in a desired glove shape. A 10"×10" polyethylene sheet was cut in the reverse silhouette of the TEFLON glass cloth, and was then disposed abutting the TEFLON glass cloth, cut in the shape of a desired glove. A laminate was then placed on each side of this polyethylene/TEFLON glass cloth layer. Four layers of TEFLON glass cloth were then placed on either side of this composite. The composite was then laminated at 330 degrees Fahrenheit and 300 PSIG for ten minutes. The cut TEFLON glass cloth was then removed from the resulting laminate, resulting in a glove-shaped cavity in the laminate in which a human hand could be placed. Lamination to form the glove was found to initially be good, but separation later occurred at the interior edges of the glove. Such separation may have been accompanied by partial delamination of one or both laminates in areas of separation.

EXAMPLE 16

Two additional laminates were selected from the three remaining laminates of Examples 10-14. A sheet of TEFLON glass cloth and a 10"×10" sheet of polyethylene were cut as in Example 15 to determine the shape of the desired glove. Lamination of the two previous laminates to the cut polyethylene sheet was accomplished as in Example 15, with the cut TEFLON glass cloth preventing lamination where it was present. Lamination was found to be similar to that of Example 15.

EXAMPLE 17

Two 10"×10" pieces of polyethylene were degreased with methyl ethyl ketone as in Example 1. A 10"×10" piece of vinylidene chloride copolymer with vinyl chloride was treated for five minutes in a saturated solution of potassium permanganate in water prepared at room temperature with pH 6.3. This piece was then laminated at 330 degrees Fahrenheit and 300 PSIG for ten minutes with four layers of TEFLON glass cloth placed on each side of the material being laminated. The resulting laminate was lightly colored and appeared to have adhesion but separated easily after an area was torn. Sufficient flow occurred during lamination that the vinylidene chloride copolymer was torn.

EXAMPLE 18

Two 10"×10" sheets of polyethylene were surface cleaned as in Example 1. A 10"×10" sheet of vinylidene chloride copolymer with vinyl chloride was treated for two minutes in the potassium permanganate solution of Example 17. The two sheets of polyethylene were then laminated to the sheet of vinylidene chloride copolymer at 330 degrees Fahrenheit and 200 PSIG for ten minutes. Press pad makeup was as in Example 17. Adhesion was essentially as in Example 17. Sufficient flow occurred during lamination that the vinylidene chloride copolymer sheet was torn.

EXAMPLE 19

Two 10"×10" sheets of polyethylene were surface cleaned as in Example 1. Both polyethylene sheets and a 10"×10" sheet of vinylidene chloride copolymer with vinyl chloride were treated for five minutes in the potassium permanganate solution of Example 17. The two sheets of polyethylene were then laminated to the sheet of vinylidene chloride copolymer at 325 degrees Fahrenheit and 100 PSIG for ten minutes. The resulting laminate looked good, without tearing of the vinylidene chloride copolymer layer, but easily separated as in Examples 17 and 18.

EXAMPLE 20

A saturated solution of potassium permanganate in water, having pH 8.5, was warmed to 150 degrees Fahrenheit in a glass tray on a hot plate. Two surface cleaned (as in Example 1) 10"×10" sheets of polyethylene, and one 10"×10" sheet of vinylidene chloride copolymer with vinyl chloride, were treated for ten minutes in the warmed solution. The treated polyethylene and vinylidene chloride copolymer sheets were then laminated together, with the vinylidene chloride copolymer sheet between the two polyethylene sheets, at 325 degrees Fahrenheit and 100 PSIG for one hour. The laminate appeared to be bonded, but could be physically separated. There did not appear to be any thermal degradation of the materials with the extended temperature exposure.

EXAMPLE 21

Two 10"×10" sheets of polyethylene were surface cleaned with methyl ethyl ketone as in Example 1. Both sheets of polyethylene and a 10"×10" sheet of vinylidene chloride copolymer with vinyl chloride were treated in a saturated solution of potassium permanganate in water, having pH of 6.0, in a glass tray at a temperature of 150 degrees Fahrenheit provided by a hot plate, for ten minutes. The three sheets were then laminated, with the vinylidene chloride copolymer layer between the two polyethylene layers, at 325 degrees Fahrenheit and 100 PSIG for twenty minutes. Adhesion was judged to be qualitatively better than resulted from Examples 17-20. However, it was possible to eventually separate the layers, with difficulty. The resulting laminate was also significantly darker in color than with the preceding examples. Following treatment, the pH of the solution had increased to 8.3, suggesting that hydroxyl ions (OH are a by-product of the treatment reaction and that pH control of the treatment solution is preferred, preferably for the treatment solution to be mildly acidic. Such control can be accomplished by addition of a suitable buffer such as magnesium sulfate MgSO$_4$; see *Kirk-Othmer*, p. 861. Alternatively, pH control of the treatment solution can be accomplished by the addition of an acid solution (such as dilute sulphuric acid) to reduce pH, or of an alkaline or base solution (such as a caustic) to increase pH, which can, for example, be metered in by a pH controller.

EXAMPLE 22

Two 10"×10" sheets of polyethylene were surface cleaned with methyl ethyl ketone as in Example 1. The two sheets of polyethylene, and a 10"×10" sheet of vinylidene chloride copolymer with vinyl chloride, were then treated in a saturated solution of potassium permanganate in water, the solution having pH of 4.0. During treatment, the solution was disposed in a glass tray held at 150 degrees Fahrenheit by a hot plate. Treatment time was ten minutes. The three treated sheets were then laminated together, with the vinylidene chloride copolymer layer being disposed between the two polyethylene layers, at 325 degrees Fahrenheit and 100 PSIG for ten minutes. Press pad makeup was as in Example 17. Initial adhesion appeared to be very good. Tearing and probing of the composite did not cause a separation of the layers.

EXAMPLES 23 and 24

Two additional laminates were formed as in Example 22, with similar results. However, additional probing of the resulting laminates eventually caused a separation of one polyethylene/vinylidene chloride copolymer interface about two months after lamination, but only with difficulty.

EXAMPLE 25

A 5"×5" piece of vinylidene chloride copolymer with vinyl chloride sheet was treated for approximately five seconds in a super saturated solution of sodium napthalene radical in glycol ether. The sodium napthalene radical and glycol ether are present in the solution in relative proportions of 46% and 54%, respectively. The treated vinylidene chloride copolymer sheet was then rinsed in alcohol, air dried and laminated to two pieces of surface cleaned (as in Example 1 ) polyethylene at 325 degrees Fahrenheit and 100 PSIG for ten minutes. Press pad makeup was as in Example 17. Adhesion appeared to be excellent. The resulting laminate has a mottled brown appearance. The composite tears easily once started. However, such tearing does not affect lamination; the layers are not thereby separated from one another. The sodium metal in the sodium napthalene radical may be attacking chloride sites on the surface of the vinylidene chloride copolymer sheet, removing chlorine atoms on the surface and leaving free radicals to make the surface more receptive to adhesion.

Alternatively, metallic sodium dissolved in or complexed with other organic materials or liquid anhydrous ammonia, or a sodium-based surface treatment such as used for preparation of fluorocarbon surfaces for bonding, could be substituted for the solution of Example 25.

Figure 2:
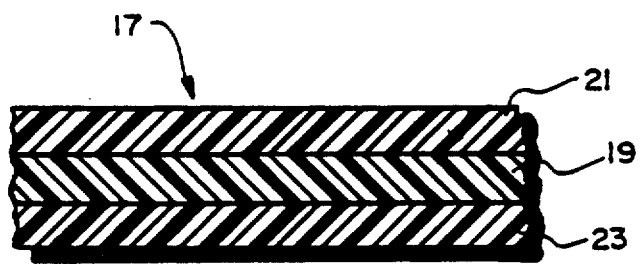
FIG. 2 is a sectional view of another laminate according to the present invention.

There is shown in FIG. 2 a preferred laminate 17 comprising a layer 19, of saran or vinylidene chloride or polymer(s) or copolymer(s) of vinylidene chloride, between layers 21 and 23 of polyethylene. This construction is preferred to that of FIG. 1 for ease of manufacture of apparel and other articles therefrom, for improved protection, and for purposes of comfort in that cling of the saran or vinylidene chloride or polymer or copolymer of vinylidene chloride to the skin is thereby avoided.

As an alternative to use of a platen for press lamination, the material of the invention can be produced using a roll laminator in which two or three or more individual films are fed from supply rolls, through a series of tensioning rollers, and then to heated pinch rollers for lamination. From the roll laminator, the resulting composite could then be wound to form a roll if desired.

Figure 3:
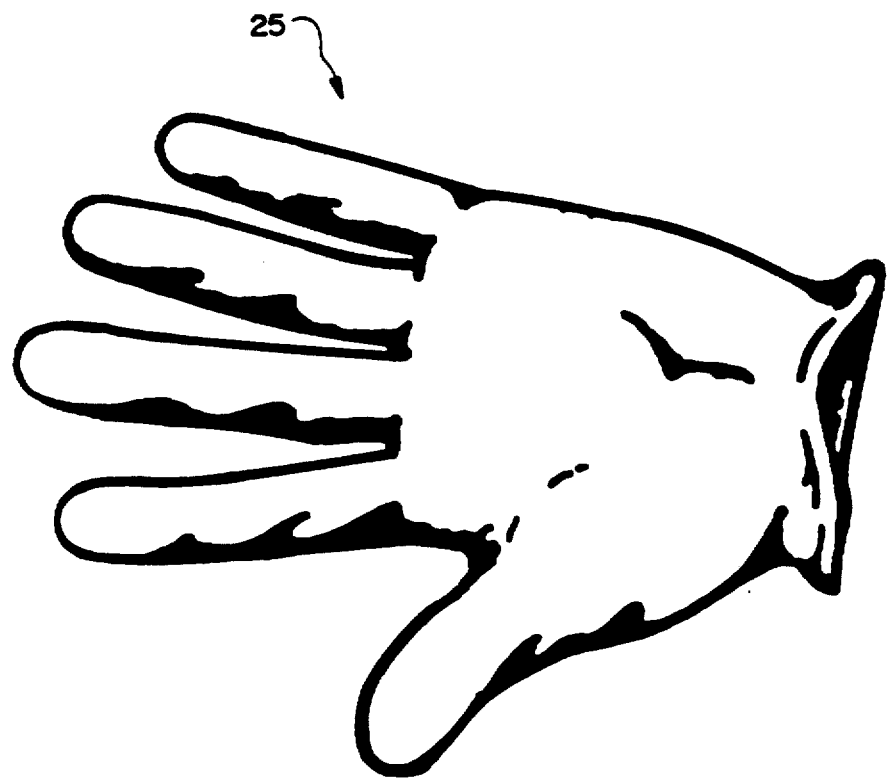
FIG. 3 illustrates a glove constructed according to the present invention.
Figure 4:
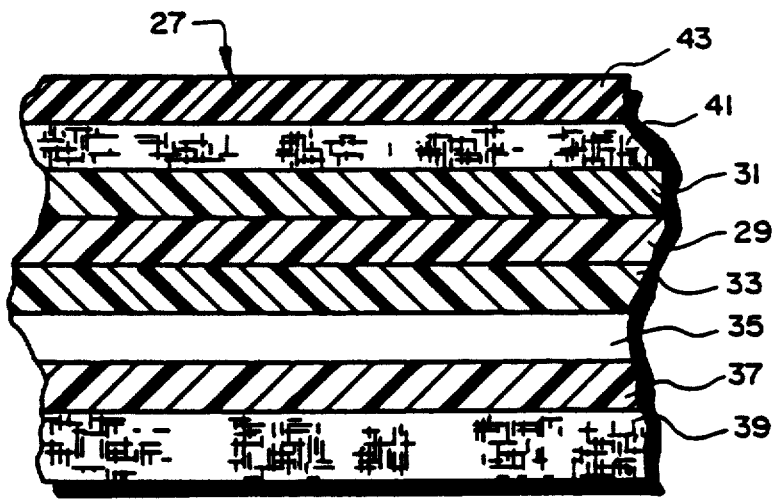
FIG. 4 is a sectional view of the material of the glove of FIG. 3.

There is shown in FIG. 3 a glove 25 according to the present invention suitable for use by a human and formed of the material 27 shown in FIG. 4, which is a cross-section of the material 27 of glove 25. Alternatively, glove 25 can be formed of the material of FIG. 1 or of the material of FIG. 2. Glove 25 can, for example, be formed by cutting such material to the desired shape, and then heat-sealing the material so cut to form a glove. Material 27 includes a layer of 29 of saran or vinylidene chloride or polymer or copolymer of vinylidene chloride between a layer 31 of polyethylene and a layer 33 of polyethylene. An indicator 35 can be placed between polyethylene layers 33 and 37; alternatively, the indicator can be placed between any two layers. A cloth backing 39 can be applied to the side of the material 27 facing the skin, for comfort and moisture absorption.

In order to incorporate a reinforcing agent, an additional reinforcing layer 41 may be provided for strength. For example, a scrim cloth 41 (such as of very coarse weave, open mesh materials) such as of fiberglass, nylon, polyvinyl fluoride, other synthetic fabric, etc., could be laminated between two layers 31, 43 of polyethylene prior to being incorporated into the composite of the invention. Alternatively, layer 41 can be of fiberglass tape.

In addition, a thin cotton or other fabric 39 can be laminated to the polyethylene layer 37 that will eventually be the inner (toward skin) layer to provide more comfort and/or absorb perspiration. Hand lotion may also be applied directly to the skin for comfort.

With a composite structure that is essentially transparent, an indicator 35 can be incorporated to warn of the penetration by general classes of materials. Indicator 35 can alternatively warn of penetration by specific species. Indicator 35 can be of paper or other absorbent material impregnated with an appropriate indicator substance. Indicator 35 can be multiply placed or encapsulated to form an array of indicator locations between layers 33 and 37, with layers 33 and 37 adhering together in some areas to separate indicator 35 within glove 25.

Ideally, indicator 35 could be incorporated into one of the polyethylene layers, but practically, it can be impregnated into an absorbent paper (such as litmus paper) and sandwiched between two layers 33, 37 of polyethylene prior to making the composite of the invention. Indicator 35 can be a single continuous layer, or can be incorporated at an array of locations (such as bubbles) between two layers 33, 37 of polyethylene.

For example, to warn of aqueous or vapor phase acids or bases, an indicator such as litmus can be used. Litmus will change color, red at pH 4.5 and below and blue at pH 8.3 and above. Litmus is a water soluble material extracted from various types of lichens, such as *V. lecanora* and *V. rocella*.

One example of a specific indicator that could be used to detect hydrogen sulfide is a mixture of p-aminodimethylanaline and ferric chloride, which reacts with hydrogen sulfide to produce a blue color.

As another example, hydroxylamine can be detected using diacetylmonoxime in the presence of a divalent nickel salt. A red complex of nickel dimethylglyoximate will result from presence of hydroxylamine. Some other materials, such as ammonium hydroxide, can also be detected using diacetylmonoxime in the presence of a divalent nickel salt, in that presence of such other materials will also result in formation of a red complex of nickel dimethylglyoximate.

Both of these reactions can be made to take place by impregnating the appropriate reagents into a paper or cloth carrier and incorporating such carrier into the composite in a manner similar to that described above.

Aldehydes, such as formaldehyde and others, can be detected by reaction with malachite green that has been decolorized with sodium sulfite. A solution of the malachite green/sulfite solution can be impregnated into filter paper or an absorbent fabric and laminated into the structure. In the presence of formaldehyde, a green color will be generated.

Iodine pentoxide in an acid medium will be oxidized in the presence of benzene, toluene or xylene to form free iodine. Iodine pentoxide can thus be used to detect benzene, toluene, and xylene. The free iodine is brown in color. The addition of starch to the iodine pentoxide would result in a deep blue color if free iodine is formed.

Alternatively, reinforcing layer 41 can be placed between a polyolefin layer and a layer of saran, vinylidene chloride or vinylidene chloride polymer or copolymer. Alternatively reinforcing layer 41 can be placed between any two polyolefin layers, or beside or as part of cloth layer 39. Alternatively, reinforcing layer 41 can be of reinforcing cloth or any suitable reinforcing material.

Alternatively, indicator 35 can be placed between any two polyolefin layers, or between a polyolefin layer and a layer of saran, vinylidene chloride, or vinylidene chloride polymer or copolymer. Indicator 35 may be present in glove 25 as a continuous layer such as impregnated in absorbent paper or cloth (such as of natural fiber). Alternatively, indicator 35 can be present only in the front and back of one finger of glove 25. Alternatively, indicator 35 can be encapsulated between two polyolefin layers, in one location or in a plurality of locations such as in a grid format.

Alternatively, any of layers 35 (with 37), 39, 41 and/or 43 could be included in laminate 17, or could be deleted from laminate 27, as desired. Alternatively, any of layers 33, 37, 39, 41 and/or 43 could be included in laminate 11, as desired. Alternatively, layer 35 could be included in laminate 11, if layer 35 is first or ultimately laminated between two layers of polyolefin. Glove 25 could alternatively be formed of such alternative laminates or materials.

Figure 5:
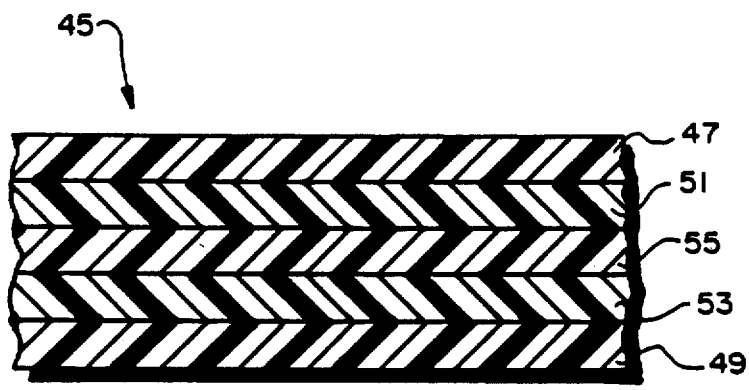
FIG. 5 is a sectional view of still another laminate according to the present invention.

Polyethylene can be coated, impregnated or pigmented with an electrically conductive (such as electrically resistive) material, so as to make such polyethylene electrically conductive. Such material can include metal, carbon or graphite. The term "electrically conductive" used herein includes electrically resistive. Such polyethylene can be incorporated into the composite material to reduce static charge on the composite material. Preferably, such reduction of static charge would be accomplished by inclusion of conductive polyethylene for static discharge as the outer and inner layer of the composite material. There is shown in FIG. 5 a laminate 45 including outer layer 47 and inner layer 49, both of such conductive polyethylene. Disposed between layers 47 and 49 are layers 51 and 53 of polyethylene and layer 55, of saran or vinylidene chloride or polymer or copolymer of vinylidene chloride or a combination thereof, therebetween.

Figure 6:
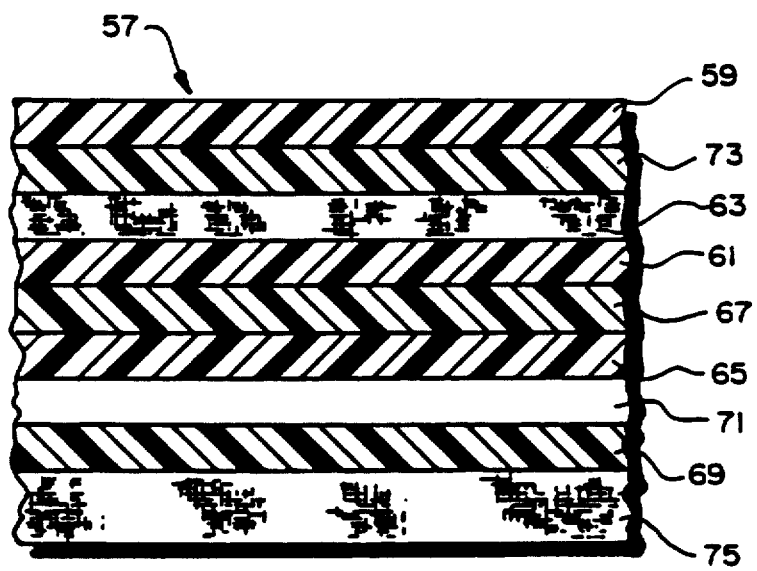
FIG. 6 is a sectional view of yet another laminate according to the present invention.

There is shown in FIG. 6 a laminate 57 including outer layer 59 of polyethylene impregnated or pigmented with an electrically conductive material so as to make such polyethylene electrically conductive. Laminate 57 also includes layers 61, 65, 69 and 73 of polyethylene; reinforcing layer 63; layer 67 of saran or vinylidene chloride or polymer or copolymer of vinylidene chloride or a combination thereof; indicator 71; and fabric 75.

Alternatively, such resistive or conductive polyethylene can be included in laminate 11 of FIG. 1 as layer 13, or in laminate 17 of FIG. 2 as layer 21 and/or layer 23, or in laminate 27 of FIG. 4 as layer 43, layer 31, layer 33, and/or layer 37. Such conductive polyethylene could alternatively or additionally be included as an internal layer, disposed such as between layers 33 and 35 of FIG. 4. Alternatively, only an outer layer of such conductive polyethylene or polyolefin could be utilized.

Figure 7:
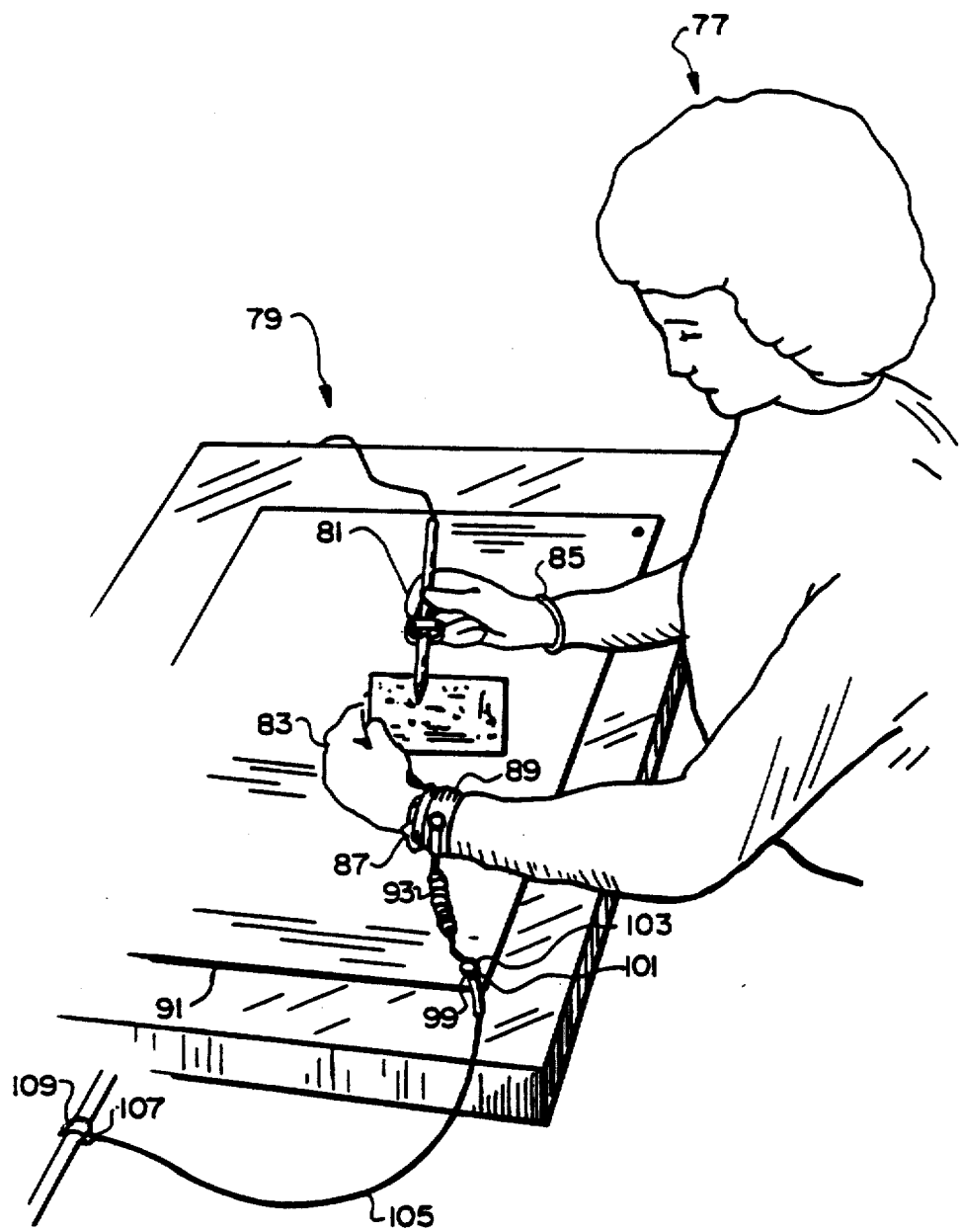
FIG. 7 illustrates other gloves constructed according to the present invention in use in a situation involving electrostatic discharge protection.
Figure 8:
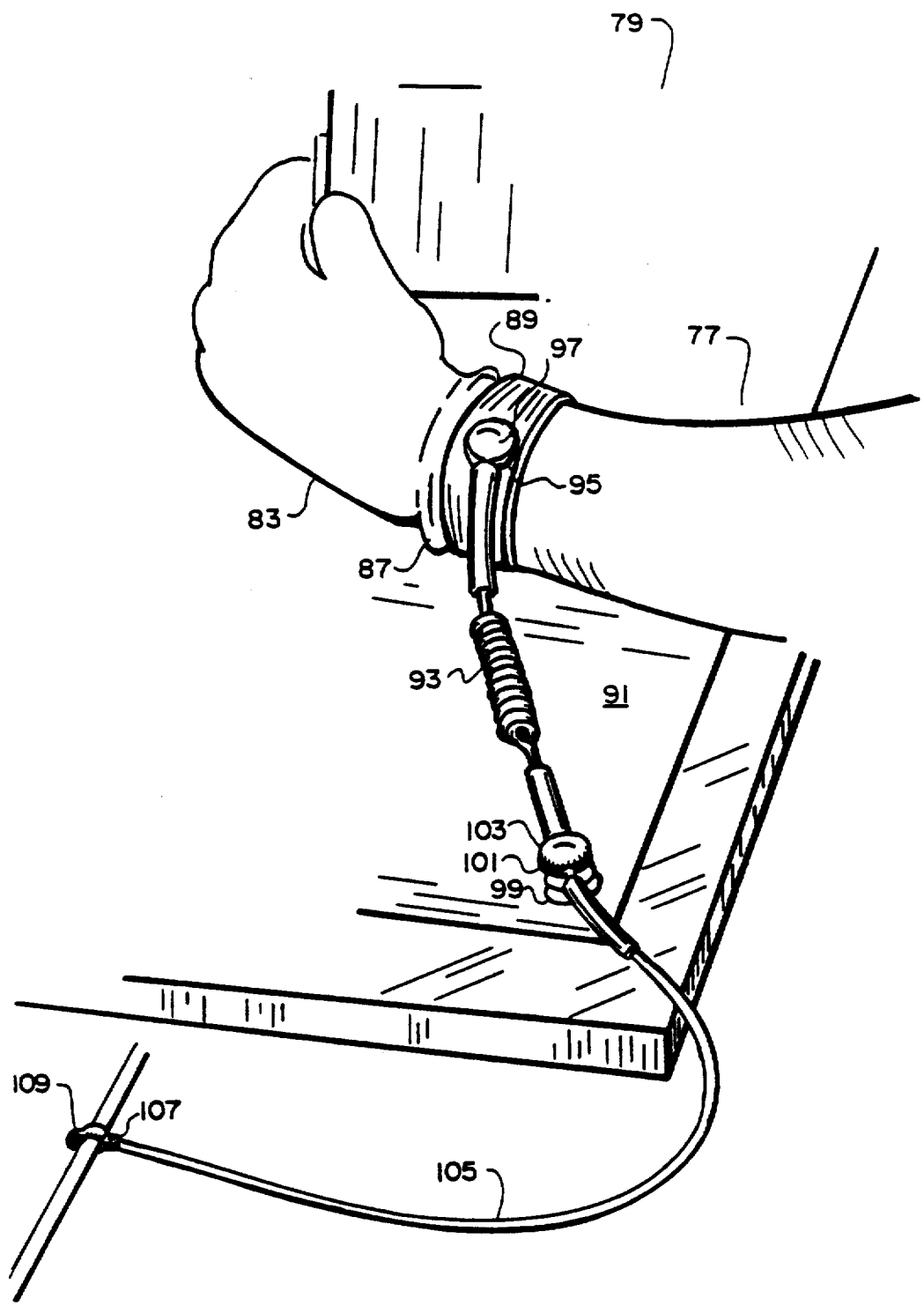
FIG. 8 illustrates, by another view, a glove of FIG. 7 constructed according to the present invention in use in a situation involving electrostatic discharge protection.

There is shown in FIGS. 7 and 8 an operator 77 seated at workstation 79 and wearing gloves 81 and 83. Gloves 81 and 83 are of laminate 45 of FIG. 5, or alternatively of laminate 57 of FIG. 6. Alternatively, gloves 81 and 83 can be formed of laminate 57 of FIG. 6, preferably with cloth backing 75 having woven into it or otherwise contained therein anti-static or conductive fibers such as of graphite or carbon, so that cloth backing 75 also is electrically conductive. If laminate 57 so modified is utilized in gloves 81 and 83, then it would be preferred to have outer layer 59 and cloth backing 75 overlap the other layers of laminate 57 such as at wrist or heel edging 85, 87 of gloves 81, 83, respectively, to provide a conductive path for static charge between the two layers and thus to the hands of the user 77. User 77 also wears on one wrist a static control wrist strap 89, connected to mat 91 by ground cord (such as a coiled wire or a straight wire) 93. Ground cord 93 is connected to wrist strap 89 by connector 95 connected to ground cord 93 which mates with corresponding connector 97 on wrist strap 89. Mat 91 is provided on its exposed surface with a connector (such as a snap connector) 99 adapted to mate and thereby connect with corresponding mating connector 101 of ground cord 105. Connector 103 at the opposite end of ground cord 93 is adapted to connect mat 91 via connector 99. The opposite end of ground cord 105 is connected via connector 107 to a suitable ground such as an electric ground line or water pipe 109 to thereby ground both wrist strap 89 and mat 91. The arrangement of wrist strap 89, mat 91, cord 93, and ground cord 105, but without gloves 81 and 83, together constitute a static dissipative workstation such as is well known in the art of electrostatic dissipation. Static control wrist strap 89 can include conductive material such as multi-strand tinsel wire sewn into a fabric band for static control. Ground cord 93 and ground cord 105 are each preferably provided with a resistor such as a one megaohm resistor to slow down static discharge and provide protection to user 77 in the event of contact with a source of electrical energy such as an electric outlet. In the arrangement of FIGS. 7 and 8, gloves 81 and 83 thereby provide protection to the user 77 against permeation and breakthrough as well as against buildup of static charge by providing a static discharge path from the respective outer layer 47 (for laminate 45) or 59 (for laminate 57) of each glove 81 or 83 to the hands of user 77 and thus to ground cord 105.

However, wearing of wrist strap 89 with gloves 81 and 83 over extended periods of time may be uncomfortable for the wearer 77. In order to dispense with the need for wrist strap 89, it may be preferable to instead provide a glove 111, of material 45 of FIG. 5, with a connector 113 corresponding to and capable of mating with a ground cord connector such as connector 117 of ground cord 115. Such an arrangement is shown in FIG. 9.

Figure 9:
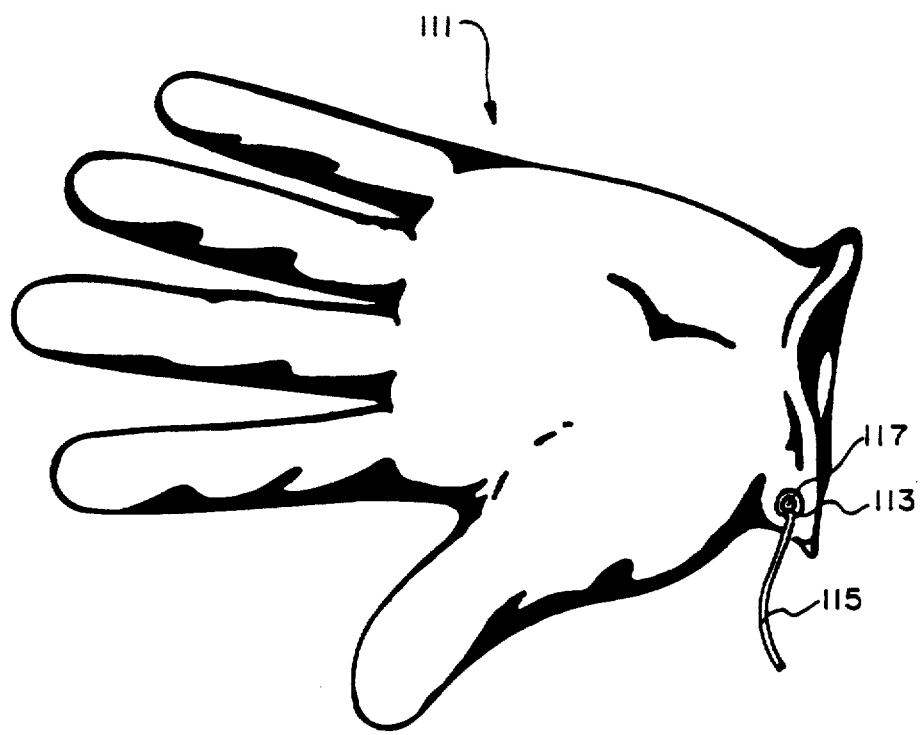
FIG. 9 illustrates another glove constructed according to the present invention.

There is shown in FIG. 9 a glove 111 according to the present invention suitable for use by a human and formed of the material 45 shown in FIG. 5, which FIG. 5 is a cross-section of the material 45 of glove 111. Alternatively, glove 111 could be formed of laminate 57 of FIG. 6. Grounding of glove 111 to remove static charge therefrom could be accomplished, for example, via a connector 113 connected to the base of glove 111 of FIG. 9, and grounding line 115 (which can be similar to ground cord 93) connected to connector 113 via connector 117. Connector 113 can, for example, be a grommet or an eyelet (such as a snap eyelet).

Alternatively, in lieu of polyolefin, it may be possible to use fluorinated ethylene propylene film, or polyester film, or film of chlorinated or fluorinated polymers such as polyvinyl fluoride.

Alternatively, the present invention can be utilized as any article of apparel or clothing, as a bag, or as an enclosure or container such as for sensitive equipment. Such an item can be formed by placing the formed film of the present invention, or stacking its individual layers, onto a mold to form a particular article such as a glove. This can be done using vacuum forming techniques where the mold would be in the shape of the article, or by heating the film and pulling a vacuum (such as with a vacuum forming machine) so that the film is drawn down over the mold and takes the shape of the mold when the film is cooled. For example, the item can be so produced in sections to form a portion of a glove, such as half a glove or three-quarters of a glove. That portion would then have to be bonded to another portion of material to make a completed article. Another approach could be using a matched mold including male and female portions that fit together with appropriate space for the material of the invention. Two sheets of the material of the invention could be utilized with the mold including a split female and a solid male so that the two halves of the female came together around the male. Using the two sheets of material one could form and seal the glove or other article in one step using a combination of heat and pressure or vacuum.

This composite material can be used as a cover or protection for articles. If the embodiment of the material of the invention used is substantially transparent, use of such material for packaging would permit an inspector to see articles, part numbers, serial numbers, etc. without opening the package.

Thus, there has been provided a novel protective material, and a method of making a protective material, which provides protection against both permeation and breakthrough. This material and method provide protection and prevention of contact with toxic chemicals such as acids, aqueous solutions, and organic solvents. This material and method provide protection to a person against both liquids and vapors.

Obviously, many modifications and variations of the present invention are possible in light of the above teachings. It is therefore to be understood that within the scope of the appended claims, the invention may be practiced otherwise than as specifically described.

What is claimed is:

1. A laminate, comprising:
   a first material selected from the group consisting of vinylidene chloride homopolymers and copolymers, and any combination thereof; and
   a polyolefin laminated to a first surface of said first material,
   wherein said first material has been surface treated on at least said first surface with a solution comprising a permanganate and water.

2. A laminate as recited in claim 1 wherein said polyolefin comprises a sheet of polyethylene or polypropylene.

3. A laminate as recited in claim 1, further comprising:
   indicator means, included in said laminate, for indicating the presence of at least one predetermined substance.

4. A laminate as recited in claim 1, further comprising means, included in said laminate, for reinforcing said laminate.

5. A laminate as recited in claim 1 wherein said permanganate comprises potassium permanganate.

6. A laminate as recited in claim 1 wherein said solution is acidic.

7. A laminate as recited in claim 1 wherein said polyolefin has been surface treated with a solution comprising a permanganate and water.

8. A laminate as recited in claim 1, further comprising:
   a layer comprising a polyolefin and an electrically conductive material.

9. A laminate as recited in claim 1, further comprising:
   an electrically conductive material included in said polyolefin.

10. A laminate as recited in claim 1, further comprising:
    a layer comprising an electrically conductive sheet comprising polyolefin.

11. A laminate as recited in claim 1 wherein said polyolefin comprises an electrically conductive sheet comprising polyolefin.

12. A laminate as recited in claim 1 wherein said first surface comprises a major surface of said first material.

13. A laminate as recited in claim 3 wherein said indicator means comprises an indicator layer laminated to said polyolefin.

14. A laminate as recited in claim 3 wherein said indicator means comprises an indicator layer laminated to said first material.

15. A laminate as recited in claim 4 wherein said means for reinforcing said laminate comprises a reinforcing layer laminated to said polyolefin.

16. A laminate as recited in claim 4 wherein said means for reinforcing said laminate comprises a reinforcing layer laminated to said first material.

17. A laminate as recited in claim 8 wherein said layer is disposed on an outer surface of said laminate.

18. A laminate, comprising:
a first material selected from the group consisting of vinylidene chloride homopolymers and copolymers, and any combination thereof; and
a polyolefin laminated to a first surface of said first material,
wherein said first surface of said first material has been oxidized.

19. A laminate as recited in claim 18 wherein said first surface comprises a major surface of said first material.

20. A laminate comprising:
a first material selected from the group consisting of vinylidene chloride homopolymers and copolymers, and any combination thereof; and
a polyolefin laminated to a first surface of said first material,
wherein chlorine atoms have been removed from said first surface of said first material.

21. A laminate as recited in claim 20 wherein said first surface comprises a major surface of said first material.

22. A laminate as recited in claim 1, 18 or 20, further comprising
a second material comprising a polyolefin and an electrically conductive third material, laminated to said first material.

23. A laminate as recited in claim 22 wherein said electrically conductive third material is mixed with said polyolefin.

24. A laminate as recited in claim 22 wherein said second material is disposed on an outer surface of said laminate.

25. A laminate, comprising:
a first material selected from the group consisting of vinylidene chloride homopolymers and copolymers, and any combination thereof; and
a polyolefin laminated to a first surface of said first material,
wherein said first material has been surface treated on at least said first surface with a solution comprising a sodium aryl compound and an organic solvent.

26. A laminate as recited in claim 25 wherein said polyolefin comprises a sheet of polyethylene or polypropylene.

27. A laminate as recited in claim 25, further comprising:
indicator means, included in said laminate, for indicating the presence of at least one predetermined substance.

28. A laminate as recited in claim 25, further comprising:
means, included in said laminate, for reinforcing said laminate.

29. A laminate as recited in claim 25, wherein:
said sodium aryl compound comprises sodium naphthalene complex; and
said organic solvent comprises glycol ether.

30. A laminate as recited in claim 25, further comprising:
an electrically conductive material included in said polyolefin.

31. A laminate as recited in claim 25, further comprising:
a layer comprising a polyolefin and an electrically conductive material.

32. A laminate as recited in claim 25, further comprising:
a layer comprising an electrically conductive sheet comprising polyolefin.

33. A laminate as recited in claim 25 wherein said first surface comprises a major surface of said first material.

34. A laminate as recited in claim 27 wherein said indicator means comprises an indicator layer laminated to said polyolefin.

35. A laminate as recited in claim 27 wherein said indicator means comprises an indicator layer laminated to said first material.

36. A laminate as recited in claim 28 wherein said means for reinforcing said laminate comprises a reinforcing layer laminated to said polyolefin.

37. A laminate as recited in claim 28 wherein said means for reinforcing said laminate comprises a reinforcing layer laminated to said first material.

38. A laminate as recited in claim 31 wherein said layer is disposed on an outer surface of said laminate.

39. A laminate as recited in claim 10 wherein said layer is disposed on an outer surface of said laminate.

40. A laminate as recited in claim 32 wherein said layer is disposed on an outer surface of said laminate.

41. A laminate as recited in claim 25 wherein said polyolefin comprises an electrically conductive sheet comprising polyolefin.

* * * * *